(12) United States Patent
Franzen et al.

(10) Patent No.: US 9,300,190 B2
(45) Date of Patent: Mar. 29, 2016

(54) FREE-SURFACE LIQUID CAPTURE DEVICE FOR ROTATING MACHINERY

(75) Inventors: Mark F. Franzen, Brodhead, WI (US); Michael J. Andres, Roscoe, IL (US); Kris H. Campbell, Poplar Grove, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 925 days.

(21) Appl. No.: 13/279,230

(22) Filed: Oct. 21, 2011

(65) Prior Publication Data

US 2013/0098585 A1 Apr. 25, 2013

(51) Int. Cl.
| H02K 9/19 | (2006.01) |
| H02K 9/193 | (2006.01) |
| H02K 1/32 | (2006.01) |

(52) U.S. Cl.
CPC .................. *H02K 9/19* (2013.01); *H02K 9/193* (2013.01); *H02K 1/32* (2013.01)

(58) Field of Classification Search
CPC .................................... H02K 9/19; H02K 5/20
USPC ........ 310/52, 54, 58, 604, 61, 60 A; 415/116, 415/211.2, 178; 165/104.19
See application file for complete search history.

(56) References Cited

U.S. PATENT DOCUMENTS

| 2,557,075 | A | * | 6/1951 | Caputo ........................ 310/178 |
| 3,272,476 | A | * | 9/1966 | Durdin et al. ................ 415/116 |
| 3,746,349 | A | * | 7/1973 | Smale et al. .................. 277/398 |
| 4,130,773 | A | * | 12/1978 | Kussel ............................ 378/123 |
| 4,992,023 | A | * | 2/1991 | Baker et al. ................. 415/171.1 |
| 5,018,181 | A | * | 5/1991 | Iversen et al. ................. 378/144 |
| 5,077,781 | A | * | 12/1991 | Iversen ........................... 378/200 |
| 6,685,447 | B2 | * | 2/2004 | Mabe et al. ................. 417/423.8 |
| 7,197,117 | B2 | * | 3/2007 | Sakata et al. ................... 378/130 |
| 7,342,332 | B2 | | 3/2008 | McAuliffe et al. |
| 7,575,421 | B2 | | 8/2009 | McAuliffe et al. |
| 7,644,792 | B2 | | 1/2010 | Telakowski |
| 7,732,953 | B2 | | 6/2010 | Telakowski |
| 7,736,129 | B2 | * | 6/2010 | Matsuo ...................... 416/186 R |
| 8,009,805 | B2 | * | 8/2011 | Smith et al. .................... 378/130 |
| 8,692,425 | B2 | * | 4/2014 | Creviston et al. ............... 310/59 |
| 2002/0101121 | A1 | | 8/2002 | Semba et al. |
| 2006/0082143 | A1 | * | 4/2006 | Pospisil et al. ................. 285/272 |
| 2008/0016950 | A1 | * | 1/2008 | Kubala .............................. 73/40 |
| 2010/0148601 | A1 | | 6/2010 | Lee et al. |
| 2010/0289386 | A1 | * | 11/2010 | Gerstler et al. ............. 310/60 A |
| 2010/0310050 | A1 | * | 12/2010 | Smith et al. .................... 378/130 |
| 2011/0092371 | A1 | * | 4/2011 | Lee et al. ....................... 505/150 |
| 2011/0156509 | A1 | * | 6/2011 | Minemura et al. .............. 310/54 |
| 2012/0286596 | A1 | * | 11/2012 | Creviston et al. ............... 310/59 |

* cited by examiner

*Primary Examiner* — Marc Norman
*Assistant Examiner* — Devon Russell
(74) *Attorney, Agent, or Firm* — Cantor Colburn LLP

(57) ABSTRACT

A free-surface liquid transfer apparatus for rotating machinery includes a stationary member. The stationary member includes a main surface configured to align to a rotating member, a landing surface arranged around the main surface configured to receive and slow a continuous film of working fluid transferred from the rotating member, an annular gap arranged around the landing surface, and a hollow torus cavity arranged proximate the annular gap configured to receive the slowed continuous film of working fluid transmitted through the annular gap.

9 Claims, 5 Drawing Sheets

FREE-SURFACE LIQUID CAPTURE DEVICE FOR ROTATING MACHINERY

GOVERNMENT LICENSE RIGHTS

This invention was made with Government support under Contract No. FA8650-06-D-2621-0002 awarded by the Department of the Air Force. The Government has certain rights in this invention.

BACKGROUND OF THE INVENTION

The present invention is generally related to liquid cooling of rotating machinery, and more particularly, exemplary embodiments of the present invention are directed to free-surface liquid transfer between rotating and stationary members of rotating machinery.

Liquid that circulates between stationary and rotating members of rotating machinery requires liquid transfer devices for liquid delivery to, and subsequent recovery from, the rotating member. A transfer tube is typically employed at the rotating member shaft centerline for liquid delivery. However, many machine designs preclude the use of another transfer tube for liquid recovery. Additionally, liquid within the rotating member shaft can exert relatively high static pressure induced by centrifugal force.

BRIEF DESCRIPTION OF THE INVENTION

According to an exemplary embodiment of the present invention, a free-surface liquid transfer apparatus for rotating machinery includes a stationary member. The stationary member includes a main surface configured to receive a rotating member, a landing surface arranged around the main surface configured to receive and slow a continuous film of working fluid transferred from the rotating member, an annular gap arranged around the landing surface, and a hollow torus cavity arranged proximate the annular gap configured to receive the slowed continuous film of working fluid transmitted through the annular gap.

According to another exemplary embodiment of the present invention, a cooling system for rotating machinery includes a stationary member, a reservoir configured to store a working fluid received from the stationary member, and a pumping system configured to remove working fluid from the reservoir. According to the exemplary embodiment, the stationary member includes a main surface configured to receive a rotating member, a landing surface arranged around the main surface configured to receive and slow a continuous film of working fluid transferred from the rotating member, an annular gap arranged around the landing surface, and a hollow torus cavity arranged proximate the annular gap configured to receive the slowed continuous film of working fluid transmitted through the annular gap.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
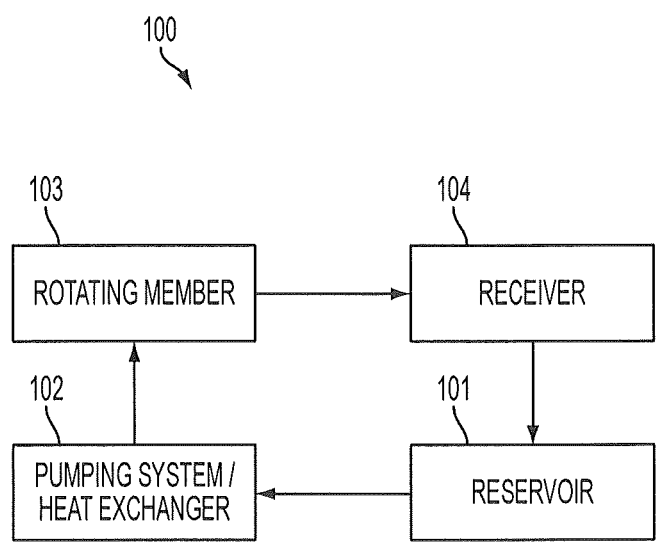
FIG. 1 is a diagram of a liquid cooling system for rotating machinery, according to an exemplary embodiment.

Exemplary embodiments of the present invention provide a free-surface, circumferentially continuous film of liquid transferring from a rotating member to a stationary member within a rotating machine. Liquid is transferred from an interior of the rotating member to the inclined surface of the slinger portion through slots of sufficient radial depth to function as a type of weir. The radial position of these slots effectively sets the inside diameter of the fluid held in the rotor by the centrifugal forces. The free surface of each weir produces an ambient pressure boundary condition within the interior of the rotating member. The shape and alignment of the rotating surface (slinger) and the stationary surfaces (receiver) are selected so that liquid film is transferred without splashing or backflow of liquid mist across the gap between rotating and stationary members. The circumferentially uniform surface of the slinger slopes such that the liquid film thins as it moves axially and radially outward on the surface of the slinger.

The stationary member, in turn, incorporates a receiver which captures the film of liquid issued from the slinger portion. The circumferentially continuous film of liquid is captured in a torus-shaped ring suitably aligned with the slinger portion. In one embodiment, the receiver performs three major functions including: landing the liquid film on a landing surface to slow the jet velocity and thicken the film; creating a liquid curtain across an annular gap entrance to a hollow torus cavity to prevent backwash of liquid and mist towards free space surrounding the rotating member; and providing overlapping drainage slots spaced uniformly around the circumference of the stationary member to prevent ponding of liquid within the hollow torus cavity. In one embodiment, the landing surface is a slightly curved surface of revolution with uniform direction of concavity.

The hollow torus cavity includes, in one embodiment, a more tightly curved toroidal surface as compared to the landing surface with a uniform direction of concavity opposite that of the landing surface. The liquid film forms a liquid curtain as it travels or "jumps" from the trailing edge of the landing surface to the leading edge of the toroidal surface. Circumferentially overlapping drainage slots formed on the toroidal surface enable drainage of liquid from the hollow torus cavity to a suitable collection sump. Depending on machine configuration, a suitable thin-wall sleeve or other barrier may be included to separate drained liquid from the free space between rotating and stationary members.

As disclosed herein, technical effects and benefits of exemplary embodiments of the present invention include capability for free-surface conveyance of liquid from a rotating member to a stationary member with minimal dispersal of liquid or mist to the free space between members. Exemplary embodiments may eliminate the need to convey the fluid through internal passages and transfer tubes where such may be difficult to implement with regard to both the physical placement of passageways and the hydraulic head needed to generate a required flow-rate. Further, exemplary embodiments are selfpumping in that sufficient hydraulic head is provided by the rotating member. Moreover, a particular benefit to aerospace electric machinery is the capability to recover oil from enclosed, liquid-immersion-cooled rotor windings of an electric machine without fouling the air gap between rotor and stator with heavy oil mist. Elimination of air gap fouling may result, in one or more embodiments, in a reduction of rotational drag resulting in higher machine efficiency, lower heat load, and lower equipment temperature.

Turning now to FIG. 1, a diagram of a liquid cooling system for rotating machinery is illustrated, according to an exemplary embodiment. The system 100 includes a reservoir 101 configured to retain a measure of a working fluid (e.g., oil) suitable for cooling of a rotating machine. The system 100 further includes a pumping system and heat exchanger 102 in fluid communication with the reservoir 101. The pumping system and heat exchanger 102 may pump working fluid from the reservoir 101 to a rotating member 103 of a rotating machine. As described above, the rotating member 103 may include a rotor and slinger portion arranged thereon, which are described more fully with reference to FIG. 2.

As further illustrated, the system 100 also includes a receiver 104 configured to receive a working fluid from the rotating member 103 and transfer the working fluid to the reservoir 101. In this manner, fluid is transferred throughout the system 100 such that heat may be transferred away from the rotating member 103 through the use of the reservoir 101 and pumping system 102.

Figure 2:
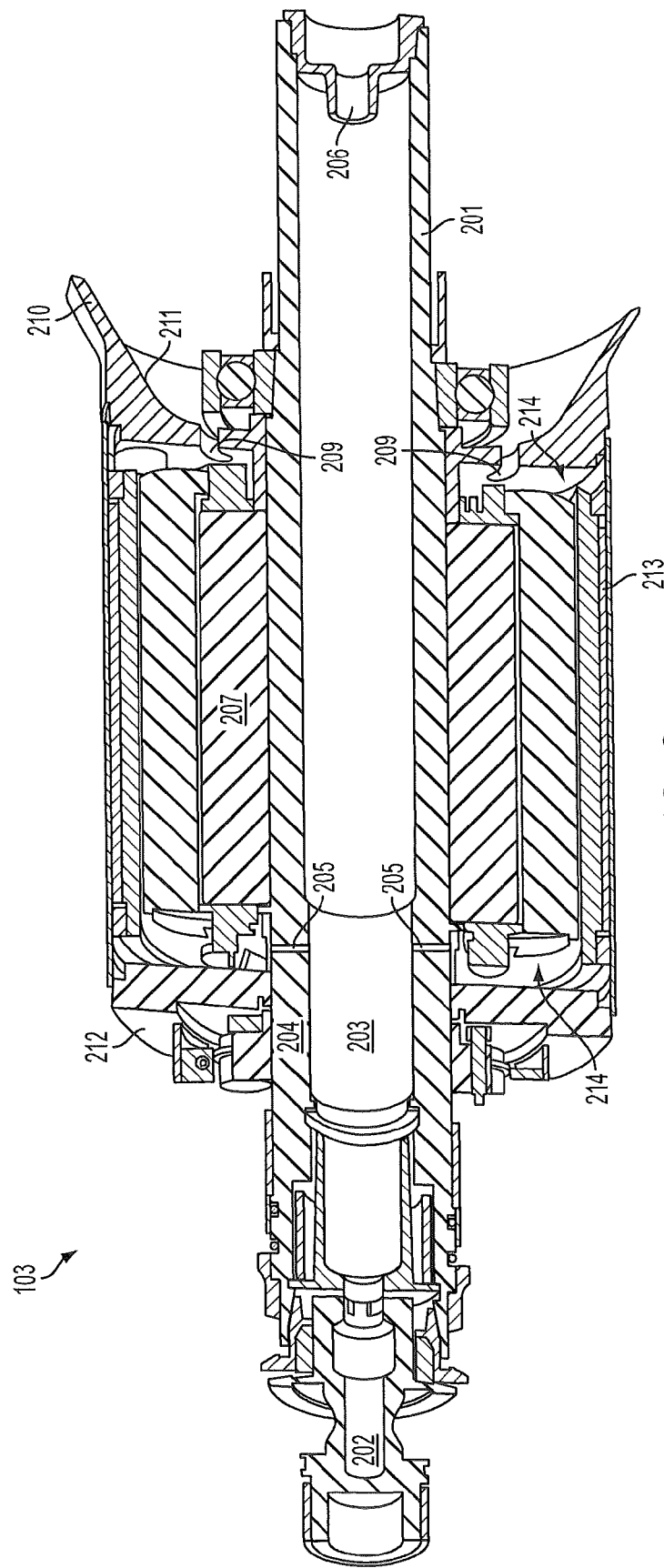
FIG. 2 is an isometric view of a rotating member of a rotating machine, according to an exemplary embodiment.

Turning now to FIG. 2, an isometric view of a rotating member 103 of a rotating machine is illustrated, according to an exemplary embodiment. The rotating member 103 includes main shaft 201 arranged collinear to a central axis of the rotating member 103. The main shaft 201 includes a first end 206 configured to receive a working fluid (e.g., oil) from a pumping system at least somewhat similar to pumping system 102, and a closed second end 202. Second end 202 typically provides mechanical power transmission between rotating member 103 and external machinery. The main shaft 201 further includes inner cylindrical wall 204 defining an inner cavity 203. A central axis of the inner cylindrical wall 204 is arranged collinear to the central axis of the rotating member 103. The inner cavity 203 may be a generally hollow cavity configured to convey working fluid throughout the rotating member 103 from the first end 206 to the second end 202.

As further illustrated, the rotating member 103 further includes outer cylindrical wall 213, first annular wall 212 spanning between the outer cylindrical wall 213 and inner cylindrical wall 204, and a slinger portion 210 also spanning between the outer cylindrical wall 213 and inner cylindrical wall 204. As shown, the first annular wall 212, slinger portion 210, inner cylindrical wall 204, and outer cylindrical wall 213 define a hollow annular cavity 214 disposed to house componentry 207 and 208 of the rotating member 103. Furthermore, a central axis of the hollow annular cavity 214 is arranged collinear to a central axis of the rotating member 103.

As further illustrated, the rotating member 103 includes a plurality of orifices 205 arranged on the inner cylindrical wall 204. The plurality of orifices 205 allow working fluid communication between the inner cavity 203 and the hollow annular cavity 214. For example, as the rotating member 103 is configured to rotate, centrifugal forces may push working fluid from the inner cavity 203 through the orifices 205 into the hollow annular cavity 214.

As further illustrated, the rotating member 103 also includes a plurality of radial slots 209 formed on the slinger portion 210. Therefore, as working fluid fills the hollow annular cavity 214 during rotation of the rotating member 103, the working fluid flows past componentry 207 and 208 cooling said componentry and exiting the hollow annular cavity 214 through the plurality of slots 209. According to one exemplary embodiment, the plurality of radial slots 209 are of sufficient radial depth such that the working fluid has a free surface as it passes over a weir formed by each slot of the plurality of radial slots 209. Furthermore, the free surface at each weir produces an ambient pressure boundary condition within the rotating member such that working fluid flow is controlled to within a desired rate to provide ample cooling while not over pressurizing the hollow annular cavity 214.

As further illustrated, the slinger portion 210 includes a main surface 211 in communication with the plurality of radial slots 209. Thus, working fluid is transferred from hollow annular cavity 214 to the main surface 211 of the slinger portion 210 through the plurality of radial slots 209. Furthermore, the main surface 211 is inclined in monotonically increasing radial direction somewhat similar to a bell or bell-like shape. Therefore, as the rotating member 103 rotates and fluid is transferred to the main surface 211, a continuous film of working fluid is produced at an outer edge of the main surface 211 with both tangential and radial velocity components. As this continuous film flows outwards, it may be transferred to a stationary member or receiver of a rotating machine. Such is illustrated and described with reference to FIGS. 3-5.

Figure 3:
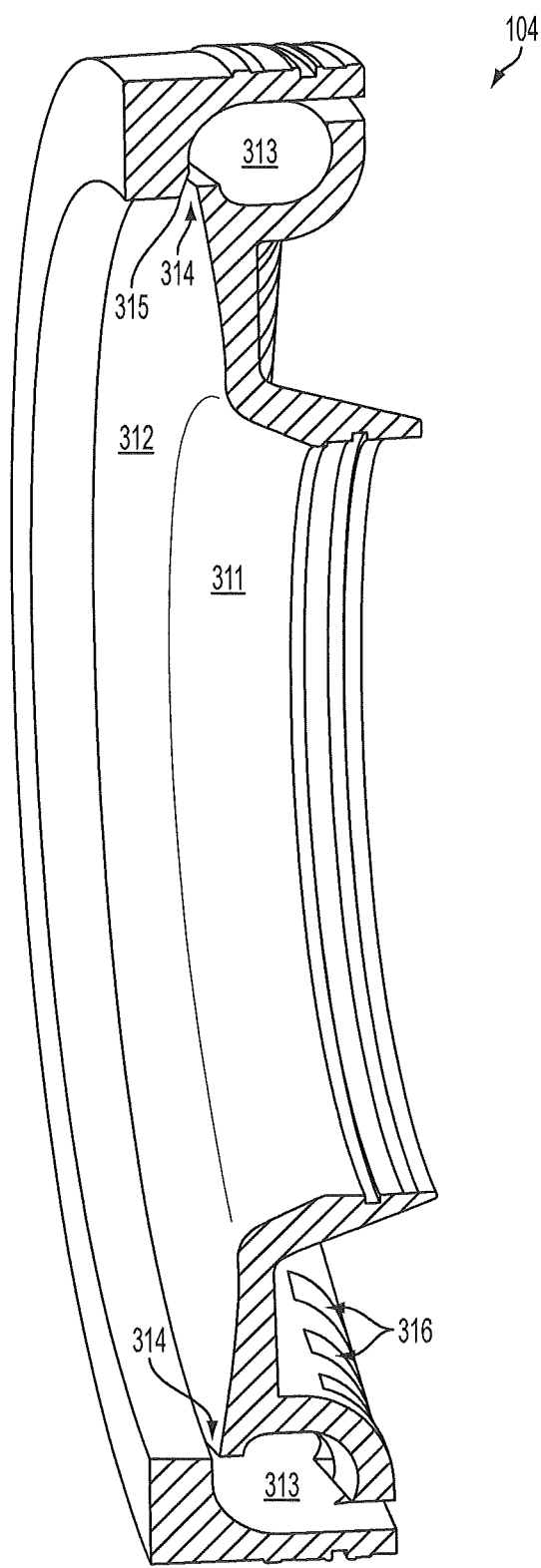
FIG. 3 is a cross sectional perspective view of a stationary member of a rotating machine, according to an exemplary embodiment.
Figure 4:
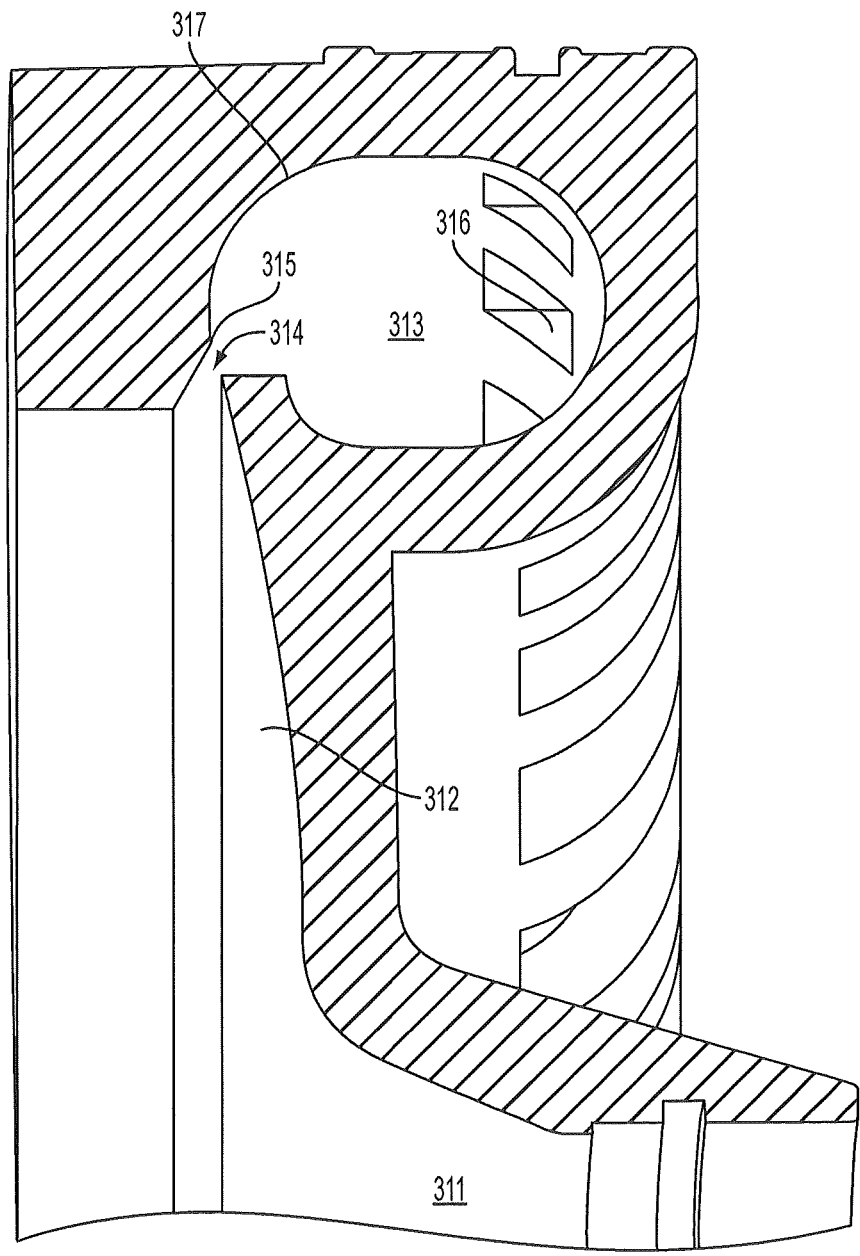
FIG. 4 is a detailed cross sectional perspective view of a stationary member of a rotating machine, according to an exemplary embodiment.

Turning now to FIGS. 3-4, a cross sectional perspective view and a detailed cross-sectional perspective view of a stationary member of a rotating machine are illustrated, according to an exemplary embodiment. As shown in FIG. 3, the stationary member 104 includes a main surface 311 and a landing surface 312 arranged around the main surface 311. The main surface may be configured to align to a slinger portion of a rotating member (illustrated in FIG. 5). The landing surface 312 may be a uniformly concave surface surrounding the main surface 311 and configured to slow a velocity of a continuous film of working fluid flowing thereon which has been received from a slinger portion of a rotating member.

As shown in FIG. 4, the stationary member 104 may further include toroidal surface 317 defining hollow torus cavity 313. A leading edge 315 of the toroidal surface 317 defines annular gap 314 which allows a working fluid to flow into the hollow torus cavity 313 forming an oil curtain spanning the entire annular gap 314. Furthermore, a plurality of drainage slots 316 formed on the toroidal surface 317 allows a working fluid to flow out of the hollow torus cavity for drainage into a working fluid reservoir, for example, reservoir 101 of FIG. 1. As illustrated, the central axes of the leading edge 315, the toroidal surface 317, the annular gap 314, and the hollow torus cavity 313 are all collinear.

Figure 5:
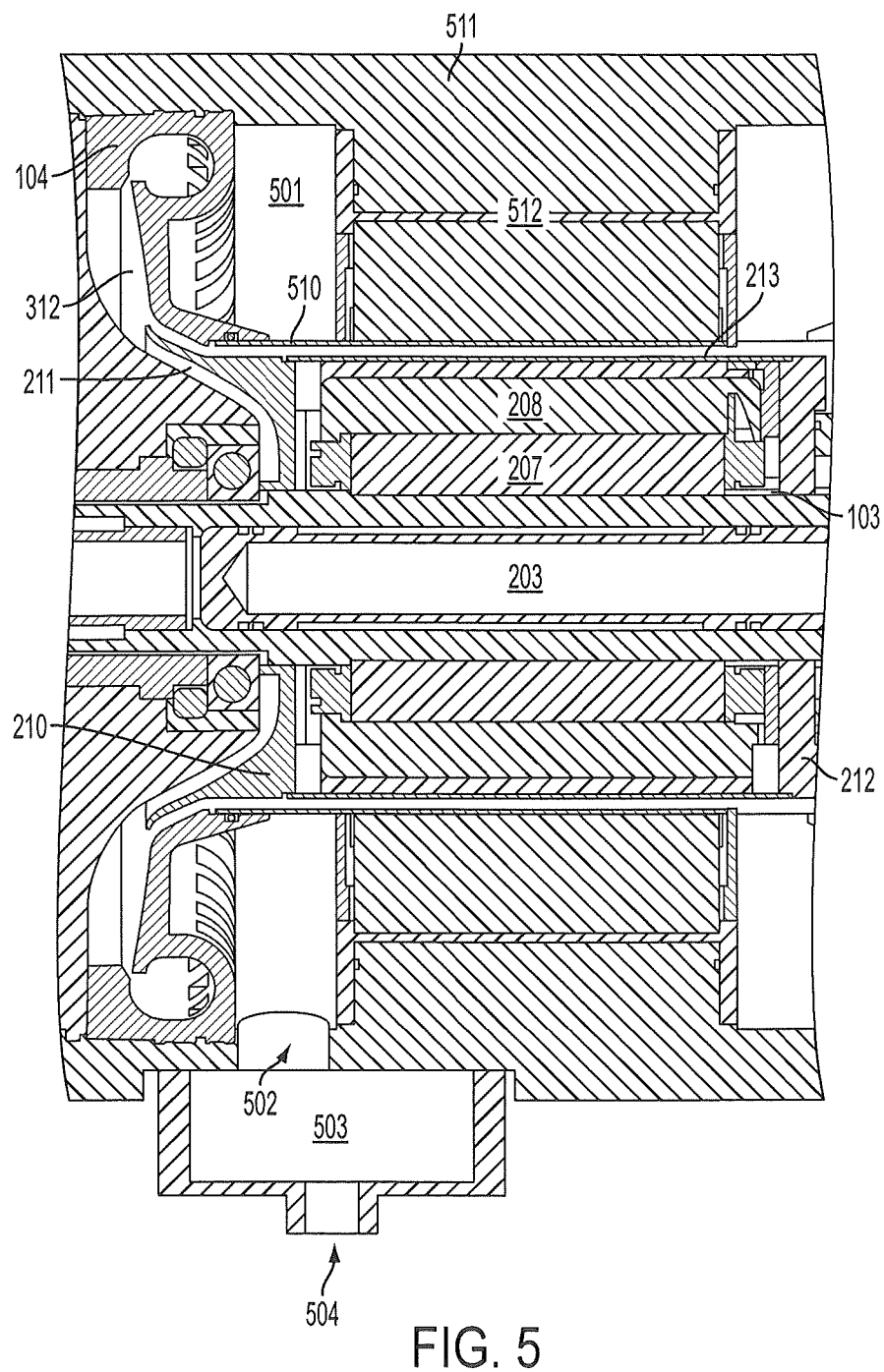
FIG. 5 is a cross sectional view of a static member and rotating member arranged to transfer fluid, according to an exemplary embodiment.

Turning now to FIG. 5, a cross sectional view of a stationary member and rotating member arranged to transfer fluid are illustrated, according to an exemplary embodiment. As shown, the stationary member 104 surrounds the rotating member 103 such that working fluid may travel from the slinger portion 210 to the landing surface 312 of the stationary portion 104. Thereafter, working fluid may flow across the landing surface 312, across annular gap 314, into hollow torus cavity 313, and through slots 316 into drainage cavity 501 formed of free space between the stationary member 104, inner cylindrical wall 510, outer cylindrical wall 511 and componentry 512. Thereafter, working fluid may flow through drainage orifice 502 into sump 503, which may further drain through orifice 504 into a suitable reservoir.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A free-surface liquid transfer apparatus for rotating machinery, comprising:
   a stationary member including:
      a main surface;
      a landing surface arranged around the main surface, configured to receive and slow a continuous film of working fluid transferred from a rotating member, and being a curved surface of revolution with uniform direction of concavity;
      an annular gap arranged around the landing surface;
      a hollow torus cavity defining a central axis thereof, arranged proximate the annular gap, and configured to receive the slowed continuous film of the working fluid transmitted through the annular gap; and
      a plurality of drainage slots staggered along a circumference of the torus cavity defined about axial cross-sections of the torus cavity and configured to drain the working fluid from the torus cavity such that the drained working fluid flows substantially parallel with the central axis.

2. The apparatus of claim 1, wherein a direction of concavity of at least a portion of the hollow torus cavity is opposite the direction of concavity of the landing surface.

3. The apparatus of claim 1, wherein the rotating member comprises:
   a main shaft defining a hollow inner cavity;
   an outer cylindrical wall defining a hollow annular cavity in fluid communication with the hollow inner cavity through a plurality of orifices formed on the main shaft; and
   a slinger formation in fluid communication with the hollow annular cavity through a plurality of radial slots formed through the slinger formation,
   wherein a central axis of the main shaft, a central axis of the hollow annular cavity, and a central axis of the slinger formation are collinear, and
   wherein the slinger formation is configured to transmit working fluid received through the plurality of radial slots outward as a continuous film having both tangential and radial velocity components.

4. The apparatus of claim 3, wherein the rotating member further comprises a plurality of rotating machine components arranged inside the hollow annular cavity.

5. The apparatus of claim 3, wherein each radial slot of the plurality of radial slots forms a weir, and wherein a radial depth of the plurality of radial slots is constant and configured to provide a free-surface for working fluid flow over each weir.

6. The apparatus of claim 3, wherein the slinger formation comprises:
   a main surface inclined monotonically in a radial direction.

7. The apparatus of claim 6, wherein the inclined main surface is circumferentially continuous about the central axis of the rotating member.

8. The apparatus of claim 1, wherein the plurality of drainage slots are defined on the toroidal surface and allow circumferential continuity of the drainage around a perimeter of the toroidal surface.

9. A free-surface liquid transfer apparatus for rotating machinery, comprising:
   a stationary member including:
      a main surface;
      a landing surface arranged around the main surface, configured to receive and slow a continuous film of working fluid transferred from a rotating member, and being a curved surface of revolution with uniform direction of concavity; and
      a toroidal surface defining a leading edge that defines an annular gap arranged around the landing surface and allows the working fluid to flow over the leading edge and along the toroidal surface into a hollow torus cavity arranged proximate the annular gap to form a curtain spanning an entirety of the annular gap, the torus cavity being configured to receive the slowed continuous film of the working fluid transmitted through the annular gap.

* * * * *